United States Patent
Zou

(10) Patent No.: US 9,874,777 B2
(45) Date of Patent: Jan. 23, 2018

(54) COLOR FILTER SUBSTRATE, TOUCH DISPLAY DEVICE AND METHOD FOR MANUFACTURING THE COLOR FILTER SUBSTRATE

(71) Applicant: BOE TECHNOLOGY GROUP CO., LTD., Beijing (CN)

(72) Inventor: Xiangxiang Zou, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 202 days.

(21) Appl. No.: 14/428,822

(22) PCT Filed: May 29, 2014

(86) PCT No.: PCT/CN2014/078852
§ 371 (c)(1),
(2) Date: Mar. 17, 2015

(87) PCT Pub. No.: WO2015/043219
PCT Pub. Date: Apr. 2, 2015

(65) Prior Publication Data
US 2015/0277186 A1    Oct. 1, 2015

(30) Foreign Application Priority Data
Sep. 30, 2013  (CN) .......................... 2013 1 0461367

(51) Int. Cl.
*G02F 1/1335*    (2006.01)
*G02F 1/1333*    (2006.01)
(Continued)

(52) U.S. Cl.
CPC .... *G02F 1/133514* (2013.01); *G02F 1/13338* (2013.01); *G02F 1/13394* (2013.01);
(Continued)

(58) Field of Classification Search
CPC .......... G02F 1/13338; G02F 1/133514; G02F 1/133516; G02F 1/13394; G06F 2203/04103
See application file for complete search history.

(56) References Cited

U.S. PATENT DOCUMENTS

2012/0105347 A1    5/2012  Pak
2012/0242939 A1*   9/2012  Li .................... G02F 1/133514
                                                    349/106
(Continued)

FOREIGN PATENT DOCUMENTS

CN    102707470 A    10/2012
CN    102722277 A    10/2012
(Continued)

OTHER PUBLICATIONS

International Search Report with Notice of Transmittal of the International Search Report of PCT/CN2014/078852 in Chinese, dated Aug. 5, 2014.
Written Opinion of the International Searching Authority of PCT/CN2014/078852 in Chinese with English translation dated Aug. 5, 2014.
First Chinese Office Action of Chinese Application No. 201310461367.9, dated Sep. 3, 2014 with English translation.
(Continued)

*Primary Examiner* — Viet Pham
(74) *Attorney, Agent, or Firm* — Collard & Roe, P.C.

(57) ABSTRACT

A color filter substrate for an in-cell touch panel, comprising: a base substrate (20); a black matrix (16) disposed on the base substrate (20) and comprising a light transmissive region and a light shielding region; a color filter (17) disposed in the light transmissive region of the black matrix (16); a set of first electrode wires (21) and a set of second electrode wires (22) disposed over the black matrix (16) and the color filter (17) and crossing each other, the first elec-
(Continued)

trode wires (21) comprises a plurality of first electrodes (24) connected in series by a bridge line (23) and the second electrode wires (23) comprises a plurality of second electrodes (26) connected in series by a connection line (25), the bridge line (23) and the connection line (25) crossing each other at a cross region corresponding to the light shielding region of the black matrix (16); and a spacer (19) disposed between the bridge line (23) and the connection line (25) to insulate the bridge line (23) from the connection line (25). With such a structure, the manufacturing process for the color filter substrate in an in-cell touch panel is simplified, and the number of the masks to be used is reduced, and the manufacturing cost is lowered down.

19 Claims, 5 Drawing Sheets

(51) Int. Cl.
*G02F 1/1339* (2006.01)
*G06F 3/044* (2006.01)

(52) U.S. Cl.
CPC ........ *G02F 1/133516* (2013.01); *G06F 3/044* (2013.01); *G06F 2203/04103* (2013.01)

(56) References Cited

U.S. PATENT DOCUMENTS

| | | | |
|---|---|---|---|
| 2013/0154949 | A1 | 6/2013 | Jamshidi Roudbari et al. |
| 2014/0036189 | A1* | 2/2014 | Yi .................... G02F 1/133512 349/43 |
| 2014/0063365 | A1 | 3/2014 | Li et al. |

FOREIGN PATENT DOCUMENTS

| | | |
|---|---|---|
| CN | 202870435 U | 4/2013 |
| CN | 103487971 A | 1/2014 |
| CN | 203519969 U | 4/2014 |

OTHER PUBLICATIONS

Second Chinese Office Action of Chinese Application No. 201310461367.9, dated May 14, 2015 with English translation.

* cited by examiner

COLOR FILTER SUBSTRATE, TOUCH DISPLAY DEVICE AND METHOD FOR MANUFACTURING THE COLOR FILTER SUBSTRATE

CROSS REFERENCE TO RELATED APPLICATIONS

This application is the National Stage of PCT/CN2014/078852 filed on May 29, 2014, which claims priority under 35 U.S.C. §119 of Chinese Application No. 201310461367.9 filed on Sep. 30, 2013, the disclosure of which is incorporated by reference.

TECHNICAL FIELD

Embodiments of the present invention relates to a touch display field, and in particularly, to a color filter substrate for a touch panel, a touch display device and a method for manufacturing the color filter substrate of a touch panel.

BACKGROUND

Currently, most of capacity touch panels are of on-cell type, that is, a touch panel and a display panel are separately manufactured and then bonded together. This technology has disadvantages such as high manufacturing cost, low transmittance, and a great thickness of the module. With the development of science and technology, in-cell touch panel is increasingly concerned by researchers in the art, the in-cell touch panel technology is that driving electrode wires and detecting electrode wires for achieving a touch function are provided on a substrate of the display panel. Compared with the on-cell touch display device, the touch display device adopting the in-cell touch panel technology has the advantages such as being thinner, higher performance, and lower manufacturing cost.

As illustrated in FIG. 1, as known by the present inventor, a color filter substrate of an in-cell touch panel comprises a transparent substrate 10, and driving electrodes 11 and detecting electrode wires 12, a first passivation layer 13, a metal bridge 14, a second passivation layer 15, a black matrix 16, a color filter 17, a flatten layer 18 and a spacer layer 19 subsequently formed on the transparent substrate, wherein the driving electrodes 11 forms driving electrode wires together with the metal bridge 14, and the driving electrode wires and the detecting electrode wires 12 are disposed intersecting with each other and are insulated by the first passivation layer 13. This technology is disadvantageous in that the color filter substrate requires at least six mask-patterning processes to be completed, and each of the patterning processes generally comprises processes such as photoresist coating, exposing, developing, etching, peeling off photoresist, and so on, which correspondingly requires at least six masks, resulting in not only the entire manufacturing process for the color filter substrate complex, but also the manufacturing cost high.

SUMMARY

One object of the embodiments of the present disclosure is to provide a color filter substrate for an in-cell touch panel, a touch display device, and a manufacturing method for the color filter substrate of the in-cell touch panel, by which the manufacturing process for the color filter substrate of the touch panel is simplified, and the manufacturing cost is reduced.

At least one embodiment of the present disclosure provides a color filter substrate for an in-cell touch panel, comprising:
  a base substrate;
  a black matrix disposed on the base substrate and comprising a light transmissive region and a light shielding region;
  a color filter disposed in the light transmissive region of the black matrix;
  a set of first electrode wires and a set of second electrode wires disposed over the black matrix and the color filter and crossing each other, the first electrode wires comprising a plurality of first electrodes connected in series by a bridge line, the second electrode wires comprising a plurality of second electrodes connected in series by a connection line, the bridge line and the connection line crossing each other, and a cross region corresponding to the light shielding region of the black matrix; and
  a spacer disposed between the bridge line and the connection line to insulate the bridge line from the connection line.

In this technical solution, by using the spacer of the color filter substrate to insulate the bridge line for the first electrode wire from the connection line for the second electrode wire, compared with the technology known by the present inventor, it is unnecessary to form a first passivation layer between the bridge line and the connection line through a patterning process, the manufacturing process for the color filter substrate in the touch panel is greatly simplified, the number of the masks to be used is reduced, and the manufacturing cost decreases.

In one embodiment, the first electrodes, the second electrodes and the connection line are disposed in the same layer, the bridge line is disposed over the connection line, or, the connection line is disposed over the bridge line. Alternatively, in one embodiment, the position of the layer on which the first electrodes, the second electrodes and the connection line are disposed can be exchanged with the position of the layer on which the bridge line is disposed. No matter which structure is employed, the manufacturing process for the color filter substrate will be simplified, and the manufacturing cost is lowered.

In one embodiment, the color filter substrate further comprises: a first flatten layer disposed over the black matrix and the color filter and below the structure composed of the set of the first electrode wires, the set of the second electrode wires and the spacer, and covering the substrate. The first flatten layer is used to flattening the surface of the black matrix and the color filter, to facilitate subsequent patterning process to be performed thereon.

In one embodiment, the color filter substrate further comprises a second flatten layer disposed over the structure composed of the set of the first electrode wires, the set of the second electrode wires and the spacer and covering the substrate. The second flatten layer is configured to flatten the surface of the color filter substrate and also to protect the electrode wires.

At least one embodiment of the present disclosure further provides a touch display device comprising the color filter substrate of the in-cell touch panel according to any one of the technical solutions as described above, the touch display device can be manufactured at a relative low cost.

At least one embodiment of the present disclosure further provides a method for manufacturing the color filter substrate of the in-cell touch panel as described above, comprising:

forming a pattern of a black matrix on the base substrate through a patterning process, the black matrix comprising a light transmissive region and a light shielding region;

forming a pattern of a color filter at least covering the light transmissive region of the black matrix through a patterning process;

forming patterns of a first electrodes, a second electrodes and a connection line over the black matrix and the color filter through a patterning process;

forming a pattern of a spacer over the connection line through a patterning process; and forming a pattern of a bridge line over the spacer through a patterning process.

In this technical solution, the color filter substrate of the in-cell touch panel can be formed through five patterning processes to the least extent, and compared with the technology known by the inventor, the manufacturing process is simplified, the number of the masks to be used is reduced, and the manufacturing cost is lowered down.

In one embodiment, after forming the pattern of the color filter, and before forming the patterns of the first electrodes, the second electrodes and the connection line, the method further comprises forming a first flatten layer covering the substrate; and after forming the pattern of the bridge line, the method further comprises forming a second flatten layer covering the substrate. The first and the second flatten layers are configured to flatten the substrate and protect the electrodes.

In one embodiment, said forming a pattern of a color filter through a patterning process comprises making patterns of the color filters for every color subsequently by using a same mask, and after making a pattern of the color filter for one color, displacing the mask by a preset distance. Thus, only one mask is required to make the color filter, resulting in the manufacturing cost lowered down.

At least one embodiment of the present disclosure further provides another method for manufacturing the color filter substrate of the touch panel as described above, the method comprises:

forming patterns of the black matrix on the substrate through a patterning process, the black matrix comprising a light transmissive region and a light shielding region;

forming a pattern of the color filter at least covering the light transmissive region of the black matrix through a patterning process;

forming a pattern of the bridge line over the black matrix and the color filter through a patterning process;

forming a pattern of the spacer on a layer structure of the bridge line through a patterning process; and forming patterns of the first electrodes, the second electrodes and the connection line over the layer structure of the spacer by patterning process.

Similarly, in this technical solution, the color filter substrate of the touch panel can be made through five patterning processes to the least extent, and compared with the technology known by the inventor, the manufacturing process is simplified, the number of the masks to be used is reduced, and the manufacturing cost is lowered down.

In one embodiment, after forming the pattern of the color filter and before forming the pattern of the bridge line, the method further comprises forming a first flatten layer covering the substrate; and after forming the patterns of the first electrode, the second electrode and the connection line, the method further comprises forming a second flatten layer covering the substrate. The present embodiment can achieve the same favorable effect as above.

In one embodiment, said forming a pattern of the color filter through a patterning process comprises making the patterns of the color filters for every color subsequently by using one mask, and after making a pattern of the color filter in one color, displacing the mask plate by a preset distance. The present embodiment can achieve the same favorable effect as above.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

In order to simplify the manufacturing process for a color filter substrate of a touch panel and lower down the manufacturing cost, at least one embodiment of the present disclosure provides a color filter substrate of a touch panel, a touch display device and a manufacturing method for the color filter substrate of the touch panel. In the technical solution of the embodiments of the present disclosure, a bridge line for a first electrode wire is insulated from a connection line for a second electrode wire by a spacer of the color filter substrate, and compared with the technology known by the inventor, it is unnecessary to form a first passivation layer between the bridge line and the connection line through additional patterning process, which greatly simplifies the manufacturing process for the color filter substrate of the touch panel, reduces the number of the masks to be used, and lowers the manufacturing cost down. The objects, technical solutions and advantages will become apparent by referring to the following description given in detail by way of examples.

Figure 1:
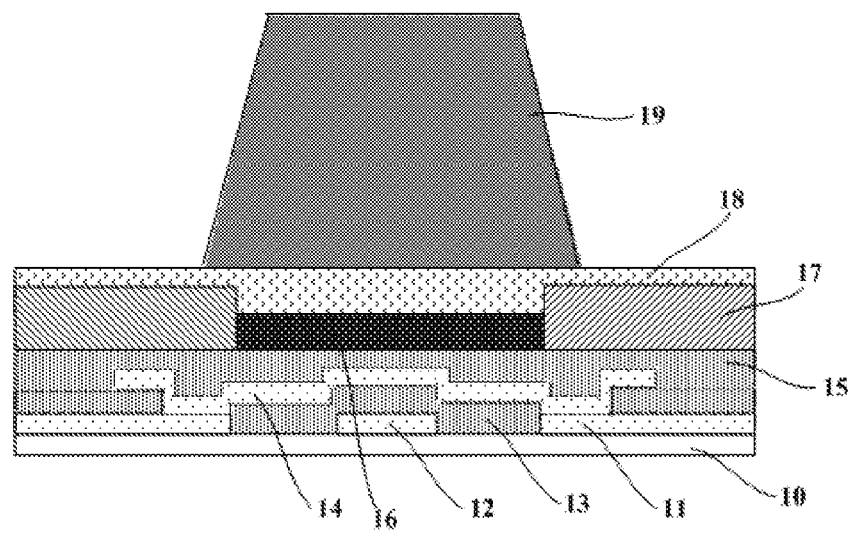
FIG. 1 is a schematic sectional structural view illustrating a current color filter substrate of a touch panel (at an electrode wire crossing region)
Figure 2:
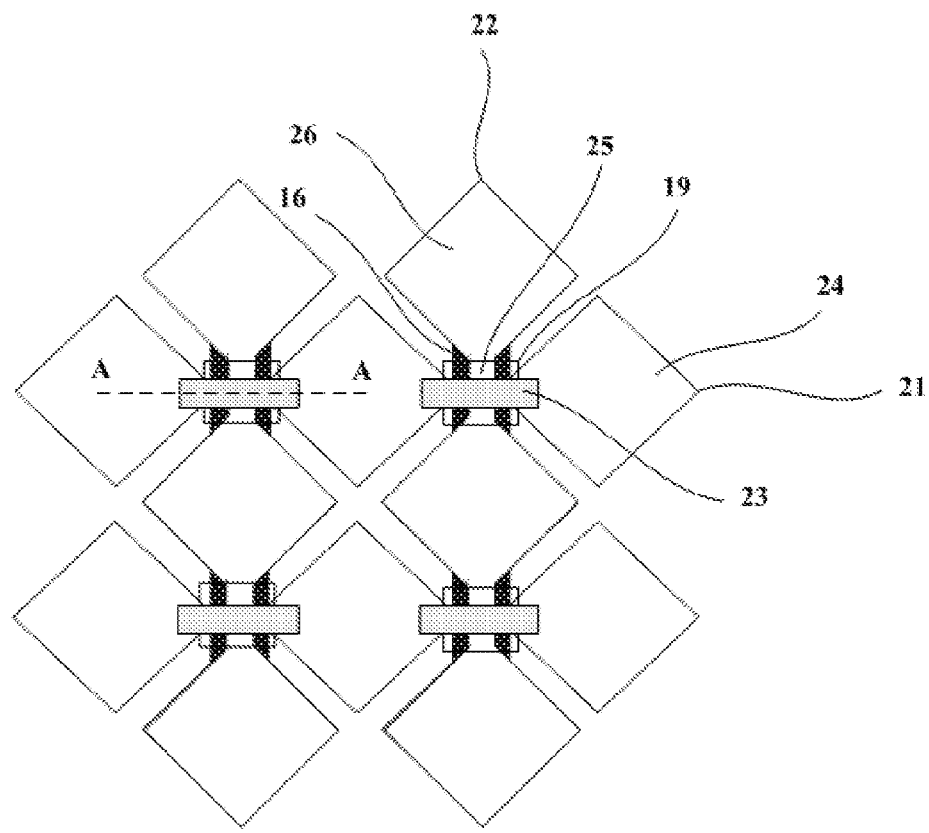
FIG. 2 is a top view schematically illustrating the structure of a color filter substrate of a touch panel according to one embodiment of the present disclosure.
Figure 3:
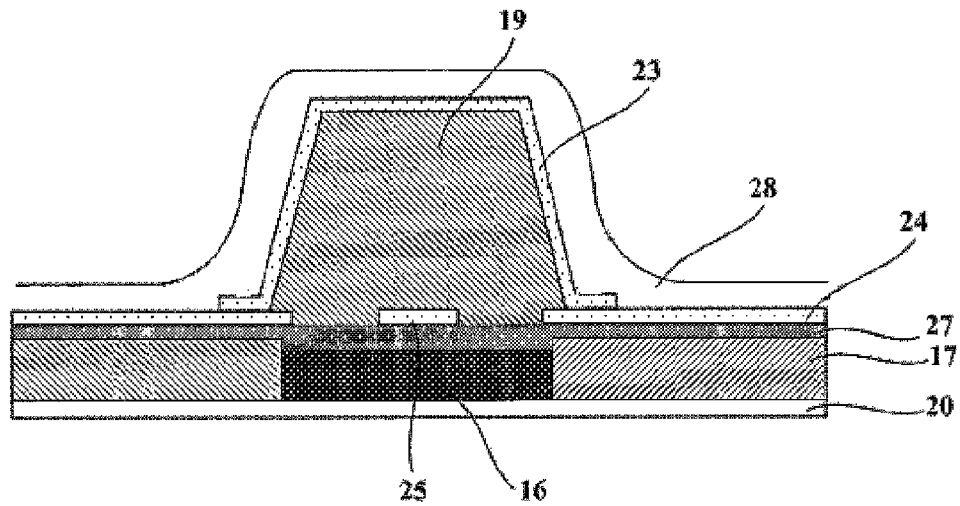
FIG. 3 is a schematic sectional structural view taken along A-A in FIG. 2.

In an embodiment as illustrated in FIG. 2 and FIG. 3, wherein FIG. 2 is a top view illustrating the structure of the color filter substrate and FIG. 3 is a schematic sectional structural view taken along A-A in FIG. 2. According to an embodiment of the present disclosure, the color filter substrate of the touch panel comprises:

a base substrate 20;

a black matrix 16 disposed on the base substrate 20, the black matrix 16 comprising a light transmissive region and a light shielding region;

a color filter 17 disposed in the light transmissive region of the black matrix 16;

a set of first electrode wires 21 and a set of second electrode wires 22 disposed over the black matrix 16 and the color filter 17 and crossing each other, the first electrode wires 21 comprising a plurality of first electrodes 24 connected in series by a bridge line 23, the second electrode wires 22 comprising a plurality of second electrodes 26 connected in series by a connection line 25, the bridge line 23 and the connection line 25 crossing each other at a cross region corresponding to the position of the light shielding region of the black matrix; and a spacer disposed between the bridge line 23 and the connection line 25 to insulate the bridge line 23 from the connection line 25.

There is no limitation set forth on material for the base substrate 20, for example, transparent glass, resin, or the like can be used. The black matrix 16 mainly functions to shield stray light by means of the light shielding area, and prevent light leakage between the pixels corresponding to the light transmissive area. The color filter 17 comprises a red (R) color filter, a green (G) color filter, and a blue (B) color filter, and mainly functions to generate RGB three primary colors in a manner of filtering colors, and then mix the RGB three primary colors with various intensity ratio to render various colors and enable the thin film transistor liquid crystal display panel to display full-color images. It should be noted that, in the liquid crystal display field, the color filters are not limited to RGB (Red Green Blue) three primary colors, but also can be any other color combination, such as RGBW (Red Green Blue White), RGBY (Red, Green Blue Yellow) or CMYK (Cyan Magenta Yellow Black), and so on.

The in-cell touch panel refers to a touch panel in which driving electrode wires and detecting electrode wires for achieving touch function are disposed on a substrate of display panel. In the present solution, each of the first electrode wires 21 and the second electrode wires 22 are disposed on the color filter substrate, the first electrode wires 21 can be driving electrode wires, and the second electrode wires 22 can be detecting electrode wires; or the first electrode wires 21 can be the detecting electrode wires, and the second electrode wires 22 can be driving electrode wires, there is no limitation herein. Material for the bridge line 23 is not limited, when the first electrode wires 21 are the driving electrode wires, the bridge line 23 can use metal, such as copper, and so on (also called metal bridge), it will facilitate to lower down the resistance of the driving electrode wires. The connection line 25 can use the same material as the first electrodes 24 and the second electrodes 26, for example, transparent conductive material such as Indium Tin Oxide, and so on.

The spacer is an assistant component used during assembling the display device, and is mainly used to control clearance between the color filter substrate and an array substrate. If a liquid crystal layer with large area and uniform thickness is desirable, it is necessary to regularly provide spacers between the color filter substrate and the array substrate. In a solution according to an embodiment of the present disclosure, the spacer 19 is formed during manufacturing the color filter substrate, is provided at a cross region of the first electrode wires 21 and the second electrode wires 22, and disposed between the bridge line 23 and the connection line 25 to insulate the bridge line 23 from the connection line 25, thus generating induce capacitance between the bridge line 23 and the connection line 25.

In the technical solution according to an embodiment of the present disclosure, the spacer 19 of the color filter substrate is used to insulate the bridge line 23 of the first electrode wires 21 from the connection line 25 of the second electrode wires 22, and compared with the technology known by the inventor, it is unnecessary to form a first passivation layer between the bridge line 23 and the connection line 25 through additional patterning process, which greatly simplifies the manufacturing process for the color filter substrate in the touch panel, reduces the number of the masks to be used, and lowers the manufacturing cost down.

Figure 4:
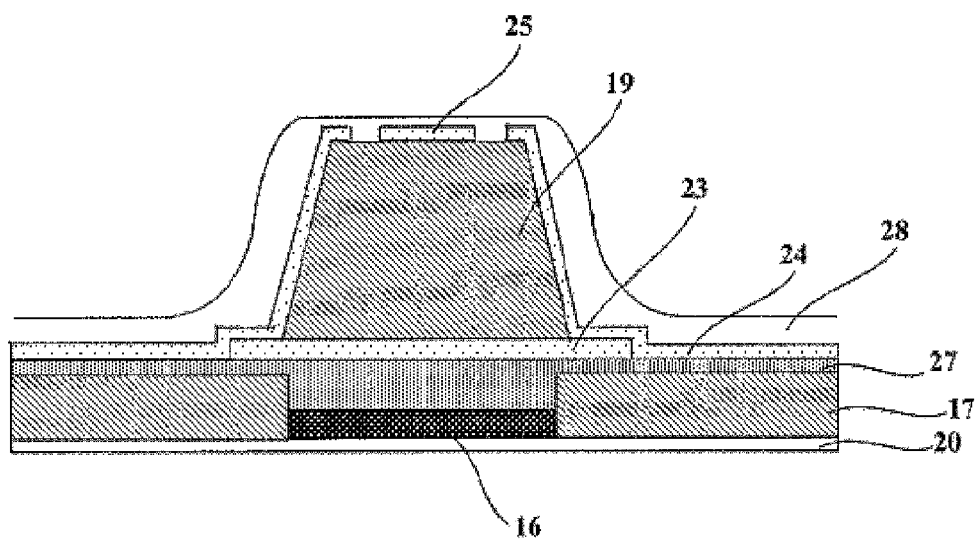
FIG. 4 is a schematic sectional structural view illustrating a color substrate of a touch panel according to another embodiment of the present disclosure.

The first electrodes 24, the second electrodes 26 and the connection line 25 can be disposed at the same layer and the bridge line 23 can be disposed over the connection line 25 (as illustrated in FIG. 3), or the connection line 25 can be disposed over the bridge line 23 (as illustrated in FIG. 4). In the color filter substrate having such a structure, the first electrodes 24, the second electrodes 26 and the connection line 25 can be formed through the same patterning process. When the bridge line 23 is disposed over the connection line 25, the layer structure of the bridge line 23 is disposed over the layer structure of the first electrodes 24, the second electrodes 26 and the connection line 25. When the connection line 25 is disposed over the bridge line 23, the layer structure on which the first electrodes 24, the second electrodes 26 and the connection line 25 are located is disposed over the layer structure of the bridge line 23. Alternatively, the position of the layer structure on which the first electrodes 24, the second electrodes 26 and the connection line 25 are located and the position of the layer structure on which the bridge line 23 is located can be exchanged. No matter which structure is employed, the manufacturing process for the color filter substrate is simplified, and the manufacturing cost is lowered down.

As illustrated in FIG. 3 and FIG. 4, for example, the color filter substrate further comprises a first flatten layer 27 disposed over the black matrix 16 and the color filter 17 and below the structure composed of the first electrode wires 21, the second electrode wires 22 and the spacer 19, covering the substrate. The first flatten layer 27 can flatten the surface of the black matrix 16 and the color filter 17, and facilitates next patterning process to be performed thereon. In the embodiment as illustrated in FIG. 3, after providing the first flatten layer 27, the first electrodes 24, the second electrodes 22 and the connection line 25 can be formed on the same plane, and thus the complexity of the manufacturing process is greatly lowered down.

Furthermore, the color filter substrate further comprises a second flatten layer 28 disposed over the structure composed of the first electrode wires 21, the second electrodes 22 and the spacer 19 and covering the substrate. The second flatten layer 28 can flatten the surface of the color filter substrate and protect the electrodes. There is no limitation on materials for the first flatten layer 27 and the second flatten layer 28, for example, resin, silicon nitride, and so on can be used.

At least one embodiment of the present disclosure further provides a touch display device comprising the color filter substrate of the touch panel according any one of the previous embodiments, since the manufacturing process for the color filter substrate is simplified compared with the technology as known by the inventor and has low manufacturing cost, the touch display device comprising such a color filter substrate will also has a lowered manufacturing cost.

Figure 5:
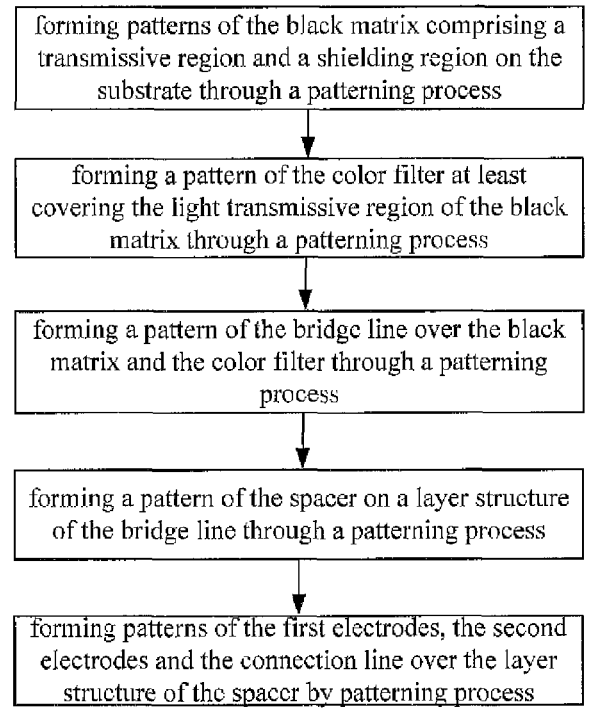
FIG. 5 is a schematic flowchart view illustrating a method for manufacturing the color filter substrate in the embodiment as illustrated in FIG. 4.

As illustrated in FIG. 5, at least one embodiment of the present disclosure further provides a method for manufacturing the color filter substrate, the method comprising the following steps:

Step 101: forming a pattern of a black matrix comprising a light transmissive region and a light shielding region on the base substrate through a patterning process;

Step 102: forming a pattern of a color filter covering at least the light transmissive region of the black matrix through a patterning process;

Step 103: forming a pattern of a bridge line over the black matrix and the color filter through a patterning process;

Step 104: forming a pattern of a spacer over the layer structure of the bridge line through a patterning process; and Step 105: forming a pattern of a first electrode, a second electrode and a connection line over the layer structure of the spacer through a patterning process.

Wherein, after the step 102 and before the step 103, the method further comprises forming a first flatten layer covering the substrate; and after the step 105, the method further comprises forming a second flatten layer covering the substrate. The first flatten layer and the second flatten layer can function to flatten the surface of the substrate and protect the substrate; and facilitates patterning processes of the color filter substrate.

In order to further lower down the manufacturing cost of the color filter substrate, the step 102 can comprise: subsequently making patterns of the color filters for each color through using the same mask, and after making a pattern of a color filter for one color, the mask being displaced by a preset distance. Thus, only one mask is used to manufacture the color filter, and the manufacturing cost is low.

Figure 6A:
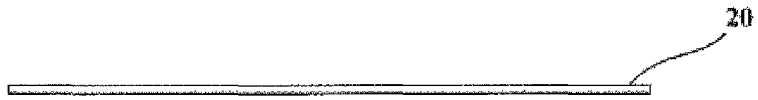
FIG. 6a is a schematic sectional structural view illustrating the base substrate before a black matrix is formed.
Figure 6B:
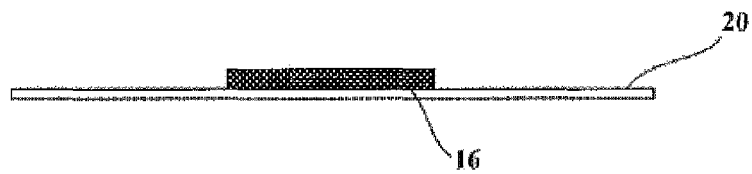
FIG. 6b is a schematic sectional structural view illustrating the base substrate after a black matrix is formed.

As illustrated in FIG. 6a to FIG. 6h, the color filter substrate illustrated in FIG. 4 can be manufactured as follows: a black photoresist film layer is deposited on a glass substrate (i.e. the base substrate 20 as illustrated in FIG. 6a), a pattern of the black matrix 16 is formed (a first mask is needed here) through a first patterning process, as illustrated in FIG. 6b.

Figure 6C:
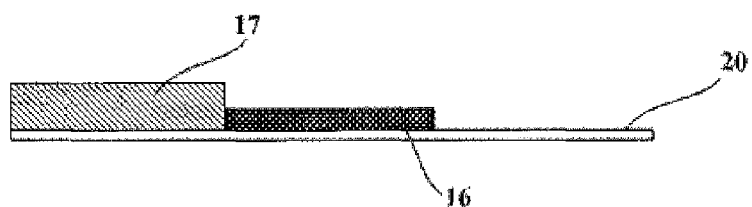
FIG. 6c is a schematic sectional structural view illustrating the substrate after a red color filter has been formed.

A red color filter film layer is deposited on the substrate on which the above steps have been completed, and through a second mask, the red color filter film layer is exposed and developed, to obtain the pattern of the red color filter, as illustrated in FIG. 6c. Here, it should be noted that the color filter can be positive photosensitive material (the exposed area will be removed after development and the unexposed area will remain after development), or the color filter can also be negative photosensitive material (the unexposed area will be removed after development, and the exposed area will remain after development). The particular structure of the second mask should be designed according to the material of the color filter, which is well known in the related art and will not be described again.

A green color filter film layer is deposited on, the substrate on which the above steps have been completed, the second mask is displaced by a preset distance and then the green color filter film layer is exposed and developed to obtain a pattern of the green color filter. The preset distance depends on the width of the light transmissive region of the black matrix, for example, the second mask plate is displaced along the lengthwise direction of the color filter substrate by a distance equal to one width of the light transmissive region.

Figure 6D:
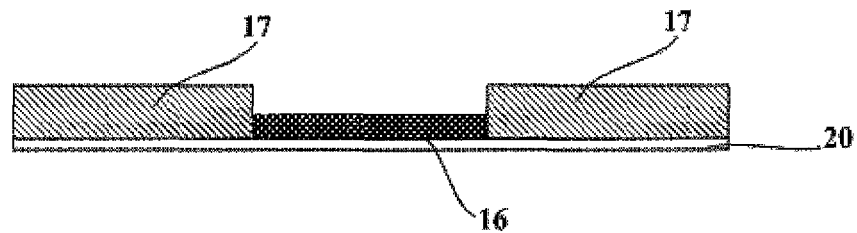
FIG. 6d is a schematic sectional structural view illustrating the substrate after RGB color filters have been formed.

A blue color filter film layer is deposited on the substrate on which the above steps have been completed, the second mask plate is displaced by the preset distance again, and the blue color filter film layer is exposed and developed to obtain a pattern of a blue color filter, as illustrated in FIG. 6d. Only one mask plate is required during the above formation of the color filter 17, thus, this process is referred to as the second patterning process.

Figure 6E:
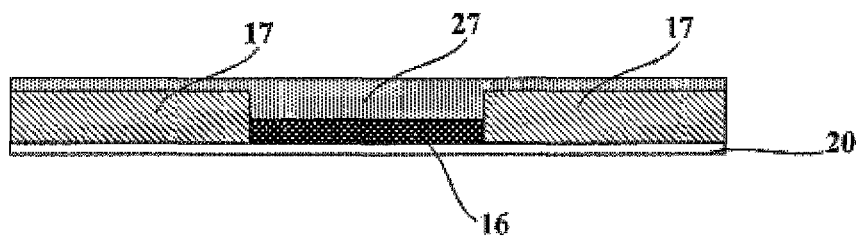
FIG. 6e is a schematic sectional structural view illustrating the substrate after a first flatten layer has been formed.

A first flatten layer 27 is spin-coated on the substrate on which the above steps have been completed, as illustrated in FIG. 6e.

Figure 6F:
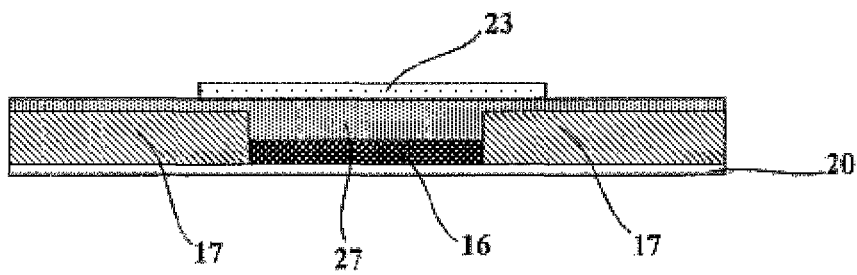
FIG. 6f is a schematic sectional structural view illustrating the substrate after a bridge line has been formed.

On the substrate on which the above steps have been completed, through a third patterning process (a third mask should be used), a pattern of a bridge line 23 is formed, as illustrated in FIG. 6f.

Figure 6G:
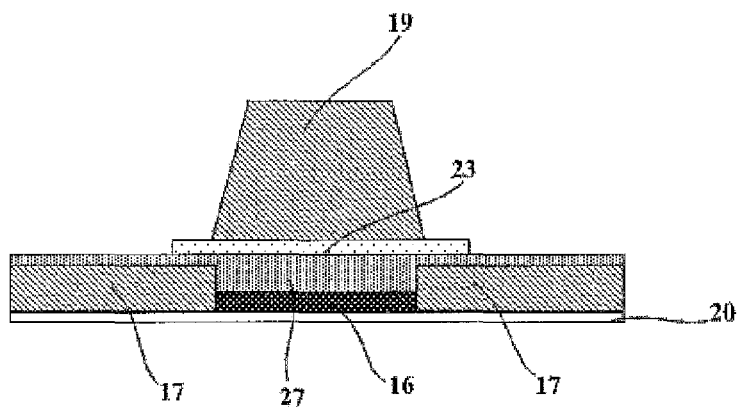
FIG. 6g is a schematic sectional structural view illustrating the substrate after a spacer has been formed.

On the substrate on which the above steps have been completed, through a fourth patterning process (a fourth mask should be used), a pattern of a spacer 19 is formed, as illustrated in FIG. 6g.

Figure 6H:
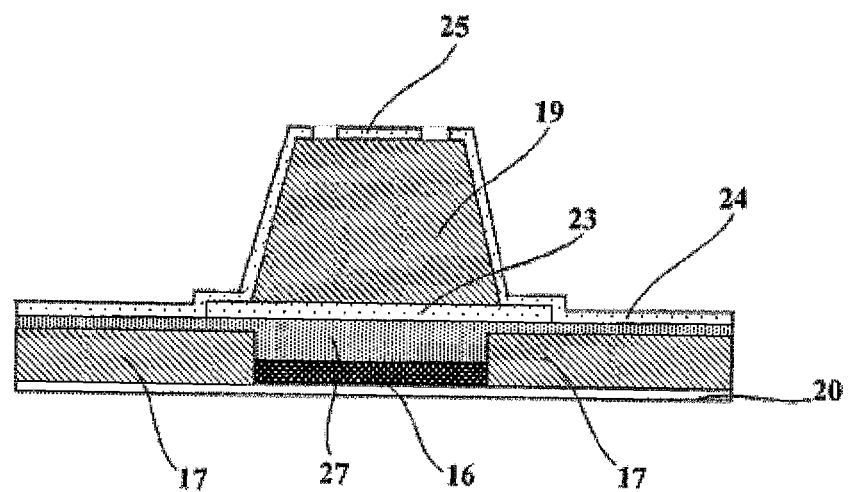
FIG. 6h is a schematic sectional structural view illustrating the substrate after a first electrode, a second electrode and a connection line have been formed.

On the substrate on which the above steps have been completed, through a fifth patterning process (a fifth mask should be used), patterns of a first electrodes 24, the second electrodes (not illustrated) and the connection line 25 is formed. The first electrodes and the second electrodes are disposed on the substrate, and the connection line is disposed on the spacer 19, at this time, the bridge line 23 bridges the first electrodes 24 at opposite sides, as illustrated in FIG. 6h.

The second flatten layer 28 is coated on the substrate on which the above steps have been completed, up to now, the color filter substrate is completed, and the structure of the color filter substrate is illustrated in FIG. 4.

It can be seen that, during this process, only five patterning processes are used to form the color filter substrate of the touch panel, and compared with the technology known by the inventor, the manufacturing processes are simplified, the number of the masks to be used is reduced, and the manufacturing cost is lowered down.

At least one embodiment of the present disclosure further provides a method for manufacturing the color filter substrate as illustrated in FIG. 3, the method comprises the following steps:

forming a pattern of a black matrix comprising a light transmissive region and a light shielding region over the base substrate through a patterning process;

forming a pattern of a color filter at least covering the light transmissive region of the black matrix through a patterning process;

forming patterns of a first electrodes, a second electrodes and a connection line over the black matrix and the color filter through a patterning process;

forming a pattern of a spacer over the connection line through a patterning process; and forming a pattern of a bridge line over the layer structure of the spacer through a patterning process.

Similar with the method embodiment as illustrated in FIG. 5, in this technical solution, only five patterning processes are used to manufacture the color filter substrate of the touch panel, and compared with the technology known by the inventor, the manufacturing processes are simplified, the number of the mask plates to be used is reduced, and the manufacturing cost is lowered down.

In one embodiment, after forming the pattern of the color filter and before forming the patterns of the first electrode, the second electrode and the connection line, the method further comprises forming a first flatten layer for covering the substrate; and after forming the pattern of the bridge line, the method further comprises forming a second flatten layer for covering the substrate. The first and second flatten layers can function to flatten the substrate and protect the electrodes.

In one embodiment, forming a pattern of the color filter through a patterning process comprises subsequently manufacturing the color filter patterns for each color through the same mask, and after making the color filter pattern of one color, the mask plate will be displaced by a preset distance. Thus, only one mask is used to manufacture the color filter, and thus the manufacturing cost is low.

The foregoing are merely exemplary embodiments of the invention, but are not used to limit the protection scope of the invention. The protection scope of the invention shall be defined by the attached claims.

The present disclosure claims the priority of a Chinese Patent Application No. 201310461367.9, filed on Sep. 30, 2013, the disclosure of which is hereby entirely incorporated by reference.

The invention claimed is:

1. A color filter substrate for an in-cell touch panel, comprising:
   a base substrate;
   a black matrix disposed on the base substrate and comprising a light transmissive region and a light shielding region;
   a color filter disposed in the light transmissive region of the color filter;
   a set of first electrode wires and a set of second electrode wires disposed over the black matrix and the color filter and crossing each other, the first electrode wires comprising a plurality of first electrodes connected in series by a bridge line and the second electrode wires comprising a plurality of second electrodes connected in series by a connection line, the bridge line and the connection line crossing each other and a cross region corresponding to the light shielding area of the black matrix; and
   a spacer disposed between the bridge line and the connection line to insulate the bridge line from the connection line when being pressed.

2. The color filter substrate according to claim 1, wherein the first electrodes, the second electrodes and the connection line are disposed on a same layer, and the bridge line is disposed over the connection line.

3. The color filter substrate according to claim 2, further comprising a first flatten layer for covering the substrate, which is disposed over the black matrix and the color filter and below a structure composed of the set of the first electrode wires, the set of the second electrode wires and the spacer.

4. The color filter substrate according to claim 3, further comprising a second flatten layer for covering the substrate, which is disposed over a structure composed of the set of the first electrode wires, the set of the second electrode wires and the spacer.

5. The color filter substrate according to claim 1, further comprising a first flatten layer for covering the substrate, which is disposed over the black matrix and the color filter and below a structure composed of the set of the first electrode wires, the set of the second electrode wires and the spacer.

6. A touch display device comprising the color filter substrate for the touch panel according to claim 2.

7. The color filter substrate according to claim 5, further comprising a second flatten layer for covering the substrate, which is disposed over a structure composed of the set of the first electrode wires, the set of the second electrode wires and the spacer.

8. A touch display device comprising the color filter substrate for the touch panel according to claim 5.

9. The color filter substrate according to claim 1, further comprising a second flatten layer for covering the substrate, which is disposed over a structure composed of the set of the first electrode wires, the set of the second electrode wires and the spacer.

10. A touch display device comprising the color filter substrate for the touch panel according to claim 9.

11. A touch display device comprising the color filter substrate for the touch panel according to claim 1.

12. A method for manufacturing a color filter substrate for an in-cell touch panel, comprising:
   forming a pattern of a black matrix comprising a light transmissive region and a light shielding region on a base substrate through a patterning process;
   forming a pattern of a color filter at least covering the light transmissive region of the black matrix through a patterning process;
   forming patterns for first electrodes, second electrodes and a connection line over the black matrix and the color filter through a patterning process;
   forming a pattern of a spacer over the connection line through a patterning process; and
   forming a pattern of a bridge line over the spacer through a patterning process, such that the spacer insulates the bridge line form the connection line when being pressed.

13. The method according to claim 12, wherein:
   after forming the pattern of the color filter and before forming the patterns of the first electrodes, the second electrodes and the connection line, the method further comprises forming a first flatten layer for covering the substrate;
   after forming the pattern of the bridge line, the method further comprises forming a second flatten layer for covering the substrate.

14. The method according to claim 13, wherein said forming a pattern for a color filter by patterning process comprises:
   subsequently making patterns of the color filters for every color through a same one mask, and after making a pattern of the color filter for one color, the mask being displaced by a preset distance.

15. The method according to claim 12, wherein said forming a pattern for a color filter by patterning process comprises:

subsequently making patterns of the color filters for every color through a same one mask, and after making a pattern of the color filter for one color, the mask being displaced by a preset distance.

16. A method for manufacturing a color filter substrate of an in-cell touch panel, comprising:

forming a pattern of a black matrix comprising a light transmissive region and a light shielding area on a base substrate through a patterning process;

forming a pattern of a color filter at least covering the light transmissive region of the black matrix by patterning process;

forming a pattern of a bridge line over the black matrix and the color filter through a patterning process;

forming a pattern of a spacer over the bridge line through a patterning process;

forming patterns of first electrodes, second electrodes and a connection line over the spacer, such that the spacer insulates the bridge line from the connection line when being pressed.

17. The method according to claim 16, wherein:

after forming the pattern of the color filter and before forming the pattern of the bridge line, the method further comprises forming a first flatten layer for covering the substrate;

after forming the patterns of the first electrodes, the second electrodes and the connection line, the method further comprises forming a second flatten layer for covering the substrate.

18. The method according to claim 17, wherein said forming a pattern of a color filter through a patterning process comprises:

subsequently making patterns of the color filters for every color through a same mask, and after making a pattern of the color filter for one color, the mask plate being displaced by a preset distance.

19. The method according to claim 16, wherein said forming a pattern of a color filter through a patterning process comprises:

subsequently making patterns of the color filters for every color through a same mask, and after making a pattern of the color filter for one color, the mask plate being displaced by a preset distance.

\* \* \* \* \*